Patented Aug. 19, 1947

2,426,091

UNITED STATES PATENT OFFICE 2,426,091

PRODUCTION OF CHLORINATED ALIPHATIC NITRILES

James John Gray, Liverpool, and Frank Burgess, Widnes, England, assignors to Imperial Chemical Industries Limited, a corporation of Great Britain No Drawing. Application December 7, 1944, Serial No. 567,116. In Great Britain January 12, 1944

11 Claims. (Cl. 260—464)

This invention relates to the production of chlorinated aliphatic nitriles, and more particularly to the production of trichloroacetonitrile.

U. S. Patent No. 2,375,545 relates to a process for the production of trichloroacetonitrile in the vapour phase, which comprises passing a mixture of chlorine and acetonitrile containing not less than the stoichiometric proportion of chlorine over a non-volatile chlorination catalyst at an elevated temperature above the boiling point of trichloroacetonitrile; suitable catalysts were stated to be active carbon and active carbon impregnated with an alkaline earth halide or with zinc chloride or copper chloride. The product was recovered by condensation and fractionation.

We have now found that aliphatic nitriles, in particular acetonitrile, can be chlorinated readily in the vapour phase by passing a mixture of the nitrile and a gaseous chlorinating agent over a noble metal catalyst at an elevated temperature.

According to the present invention, therefore, a process for the production of a chlorinated aliphatic nitrile comprises reacting an aliphatic nitrile with a chlorinating agent in the vapour phase in the presence of a catalyst comprising a noble metal or an oxide, hydroxide or salt of a noble metal, at an elevated temperature.

In one form of the invention, trichloroacetonitrile is produced by passing a vapourous mixture of acetonitrile and a chlorinating agent, containing not less than the stoichiometric proportion of chlorinating agent, over a noble metal catalyst at an elevated temperature, preferably above 200° C.: a suitable proportion of chlorinating agent is that which will provide between 6 and 8 atoms of chlorine to one molecule of acetonitrile.

For the chlorination, chlorine gas or any other effective chlorinating agent which vaporises at a temperature below about 200° C., for example phosgene or sulphuryl chloride, may be used. The catalyst may comprise any of the noble metals, for example gold, silver, platinum, palladium, rhodium, either as the free metal or as an inorganic compound of the metal. The metal or compound may be employed either without support, in a porous form, or supported on a porous carrier; suitable carriers are, for example, asbestos, pumice, silica gel, granular beryl, and sintered alumina. Catalysts which have been found to be active for the chlorination of acetonitrile with chlorine, phosgene, and sulphuryl chloride include platinized asbestos, platinum sponge, platinum oxide, palladized asbestos, palladium oxide, gold on asbestos, the chlorides of platinum, rhodium, palladium, gold and silver on asbestos, silver chloride on pumice and on silicia gel, and platinum-rhodium catalysts on beryl and on sintered alumina. Silver chloride, preferably supported on pumic, has proved to be a particularly effective catalyst for the vapour phase reaction between acetonitrile and a chlorinating agent to produce trichloroacetonitrile. By using a silver chloride catalyst better yields of trichloroacetonitrile are obtained and less carbon tetrachloride, which is a main byproduct of the reaction, is formed. This catalyst possesses the additional advantage that it can be used apparently for an indefinite length of time without permanent deterioration, for although the efficiency does decrease to some extent after prolonged use, or as a result of overheating, the catalyst can be revived by heating in a mixture of chlorine and oxygen, and this revival can be repeated many times. Other noble metal catalysts, when used for a prolonged period, eventually suffer irremediable deterioration due to the fact that the chlorides of all the noble metals except silver are volatile or decompose at comparatively low temperatures, so that at the temperatures employed for the chlorination of acetonitrile at least part of the noble metal chloride, which if not originally present is formed by the action of chlorine on the metal, is lost and the catalyst mass is corroded. Another cause of catalysts deterioration is the deposition of carbonaceous matter, which in the case of the silver chloride catalyst is negligibly small. Pumice is the preferred support, since higher yields are obtained when it is employed, and the possibility of the reactant gases channelling through the catalyst mass, as has been found to occur, for example with asbestos, is eliminated.

The noble metal catalysts are in most cases prepared by known methods. For example, a supported noble metal chloride catalyst may be prepared by soaking the asbestos or other support in a solution of the chloride and then drying at an elevated temperature. Metallic platinum and platinum oxide are obtained by known methods from chloroplatinates and the palladium catalysts are prepared by analogous methods. A catalyst comprising gold on asbestos may be prepared by treating the asbestos with chlorauric acid, drying, and heating in a stream of nitrogen. A silver chloride catalyst may be prepared by soaking pumice, asbestos, silica gel or other suitable porous supporting medium in an aqueous silver salt, for example silver nitrate solution, for a few minutes, partially drying and exposing to moist air containing hydrochloric acid, whereby the porous material is impregnated with the precipitated silver chloride.

The preferred catalyst according to this invention consists of silver chloride supported on prunes. This catalyst may conveniently be prepared in the following way: acid-washed granular pumice is soaked in an aqueous solution of silver nitrate, and is then dried by heating in an open tray, suitably at a temperature of approximately 100° C., with frequent agitation. Air which has been bubbled through concentrated hydrochloric acid is then passed through the dried material until nitrous fumes can no longer be detected. The concentration of the silver chloride on the pumice may vary, but should not be greater than approximately 18.5 parts by weight of silver chloride on 100 parts by weight of pumice: this concentration is obtained by soaking 100 parts of pumice in an aqueous solution containing approximately 22 parts by weight of silver nitrate, and then treating with hydrochloric acid as described. The best efficiency is obtained with a catalyst containing between approximately 3.5 and 5.5 parts by weight of silver chloride on 100 parts by weight of pumice, which is prepared by treating 100 parts of pumice with an aqueous solution containing approximately 4.2 to 6.5 parts by weight of silver nitrate and subsequently with moist air containing hydrochloric acid.

In carrying out the invention, slight modifications in the apparatus and method are necessary according to the chlorinating agent and catalyst employed. In one method of carrying out the invention, in which a liquid chlorinating agent such as sulphuryl chloride or liquid phosgene is used, liquid acetonitrile and the chlorinating agent are mixed in the proportions which will provide between 6 and 8 atoms of chlorine to one molecule of acetonitrile. The liquid mixture is vaporised gradually, and the mixed vapours are caused to pass over the catalyst in the reaction chamber at a space velocity such that the reactant vapours are in contact with the catalyst for a sufficient length of time to ensure completion of the reaction. A suitable space velocity may be between 1 and 7 reciprocal minutes. During the process the catalyst is maintained at an elevated temperature, for example between 300° C. and 500° C. Some variations in technique are necessitated by the difference in boiling point between phosgene and sulphuryl chloride. Thus, sulphuryl chloride may be mixed with acetonitrile at room temperature in the proportions of approximately 4.5 volumes of sulphuryl chloride per volume of acetonitrile, equivalent to a molecular ratio of 3.0 to 1, and the mixture may then be evaporated and passed through the heated catalyst mass at a controlled rate. When using phosgene, the phosgene and acetonitrile may be mixed, suitably in the proportions of approximately 4 volumes of phosgene per volume of acetonitrile, either in the vapour phase or in the liquir phase with cooling and subsequent evaporation, as desired. The gaseous mixture is then passed through the heated catalyst mass at a rate controlled to give the required space velocity.

In a second method of carrying out the reaction, employing chlorine gas as the chlorinating agent, the chlorine is bubbled through liquid acetonitrile, which is maintained at a temperature, for example between 35° C. and 45° C., such that there is formed a vaporous mixture of chlorine and acetonitrile in the proportions of between 3 and 4 molecules of chlorine to one molecule of acetonitrile. This mixture is passed into the reaction chamber and through the catalyst mass at a space velocity of between 1 and 7 reciprocal minutes, while the reaction temperature is maintained above 200° C., suitably between 250° C. and 500° C.

In carrying out the process of the invention by either of the methods described above, it is desirable that the catalyst packing should be extended into the cooler part of the reaction chamber, towards the point of entry of the reactants, whereby any tendency for pre-ignition of the reactant mixture to occur is reduced.

After passing through the heated catalyst chamber the mixture of vapours resulting from the reaction is contacted with water, so that the soluble constituents are removed and the greater part of the reaction products is condensed. The residual gases may then be cooled in order to condense any remaining product, or they may be passed through a suitable scrubber, which may contain, for example, a caustic solution, whereby any residual chlorine is removed and the product is precipitated. The crude product is separated from the aqueous layer, washed further with water, dried, for example by means of calcium chloride, and subjected to fractional distillation.

The optimum temperature for the reaction varies according to the chlorinating agent employed, and also depends upon the catalyst used. Thus the chlorination of acetonitrile can be effected satisfactorily at a lower temperature with chlorine than with sulphuryl chloride or phosgene. With regard to the catalyst, the optimum temperature appears to depend more upon the supporting material than on the noble metal or compound thereof employed, apart from considerations of the volatility of the noble metal chlorides. For example, with most of the noble metal catalysts, the optimum temperature for the reaction between acetonitrile and sulphuryl chloride or phosgene is about 400° C., whereas when chlorine is used with the same catalysts, the reaction proceeds satisfactorily at approximately 300° C. However, when the catalyst employed consists of silver chloride on asbestos, the optimum temperature for the chlorination of acetonitrile with chlorine gas is approximately 320° C., while with a catalyst of silver chloride on pumice, for the same reaction the optimum temperature is approximately 440° C.

The space velocity at which the reactant vapours pass through the catalyst mass may be varied, but it is not desirable to employ space velocities outside the range of 1 to 7 reciprocal minutes. Preferably the reactant mixture should travel at a space velocity within the approximate limits of 2 to 4 reciprocal minutes, although exceptions to this may occur with some catalysts. For example, with a catalyst consisting of gold on asbestos, the best yield of trichloroacetonitrile is obtained at a space velocity of approximately 5.0 reciprocal minutes, using chlorine as the chlorinating agent.

Furthermore, the temperature and space velocity are to some extent interdependent; the higher the space velocity, the higher the temperature required, for example with a space velocity of 7.5 reciprocal minutes the optimum temperature is between 450° C. and 460° C., using a silver chloride-pumice catalyst and chlorine as the chlorinating agent. However, the use of high temperatures and high space velocities causes a decrease both in the efficiency of the process and in the catalyst life, and at temperatures of the order of 550° C. or higher deposition of carbon occurs, even with a silver chloride catalyst, at such a rate that the reactor becomes blocked in a relatively short time. It is therefore desirable to avoid the use of temperatures above approximately 500° C. or of space velocities higher than 7 reciprocal minutes.

The crude product obtained by this process usually contains between 80% and 90% of trichloroacetonitrile and some carbon tetrachloride as the main impurity. The amount of carbon tetrachloride present varies widely, and may be very small or may be up to 20% or more. In addition, small quantities of monochloroacetonitrile, dichloroacetonitrile, and trichloroacetonitrile polymer may be present. We have found that if slightly less than the stoichiometric proportion of chlorinating agent is employed, in the presence of a noble metal catalyst, the products obtained substantially consist of trichloroacetonitrile and unchanged acetonitrile, only traces of monochloroacetonitrile or dichloroacetonitrile being formed. However, in order to obtain the maximum yield of trichloroacetonitrile from the acetonitrile used, we prefer to employ not less than the stoichiometric proportion of chlorinating agent.

As has already been mentioned, a catalyst comprising silver chloride on pumice may be used for a more or less indefinite length of time, by virtue of the fact that it is capable of being revived when the efficiency decreases. This revival may be accomplished by passing a mixture of chlorine and oxygen over the catalyst while heating it to a temperature above about 550° C., preferably to approximately 700° C., for a period of from 1 to 4 hours, or longer if desired.

The process of the invention may be applied to the chlorination of other aliphatic nitriles, particularly the lower aliphatic nitriles, for example propionitrile.

The following examples illustrate but do not limit the invention, all parts being parts by weight.

*Example 1*

A mixture of 87 parts of acetonitrile and 875 parts of sulphuryl chloride was vaporised and the mixed vapours passed through a chamber packed with platinized asbestos catalyst maintained at a temperature of 400° C. The space velocity was approximately 5 reciprocal minutes. The vapours issuing from the catalyst chamber were contacted with water, when the crude product condensed and formed a separate layer. This layer was removed, washed with further water, dried by means of calcium chloride and distilled. The fraction distilling between 79° C. and 86° C. was collected and amounted to 128 parts, of which 9% was found to be carbon tetrachloride, the remainder being substantially all trichloracetonitrile.

*Example 2*

Chlorine was bubbled through acetonitrile at the rate of 158.3 parts per hour for 4 hours, the temperature of the acetonitrile being maintained at 38° C. so as to produce a mixture of chlorine and acetonitrile vapour in the proportions of 3.5 molecules of chlorine to one molecule of acetonitrile; 75.6 parts of acetonitrile were consumed. The mixture of chlorine and acetonitrile vapour passed into a reaction chamber, which was packed with a catalyst consisting of gold chloride on asbestos, and maintained at a temperature of 320° C. The space velocity was approximately 5 reciprocal minutes. The gaseous reaction products were condensed by contacting with water, dried by means of calcium chloride and distilled. Two fractions were collected; the first fraction distilling between 79° C. and 83° C. amounted to 81.4 parts, of which 19% was carbon tetrachloride, and the second fraction distilling between 83° C. and 87° C. consisted of 66 parts of 98% trichloroacetonitrile. Hence the total amount of substantially pure trichloroacetonitrile produced was 134 parts.

*Example 3*

The catalyst consisted of 165 parts of pumice impregnated with 8 parts of silver chloride and was prepared as follows: the pumice, in granules of approximately $\frac{1}{16}$ inch diameter, was moistened with a solution of 10 parts of silver nitrate in 100 parts of water, and was then dried in an open tray at 100° C., with frequent agitation. The dried material was placed in a tube, and air which had been bubbled through concentrated hydrochloric acid was passed through the tube until nitrous fumes could no longer be detected.

Chlorine gas was bubbled through liquid acetonitrile maintained at a temperature of 38° C. to give a mixture containing 3.5 molecules of chlorine to one molecule of acetonitrile, 95 parts of acetonitrile being consumed in 7 hours. The gaseous mixture passed through the reaction chamber, which was packed with the silver chloride-pumice catalyst described above and was maintained at a temperature of 435° C. to 440° C., at a space velocity of approximately 3.5 reciprocal minutes. The reaction products were condensed by contacting with water, and the crude product was separated, washed with water, dried over calcium chloride and fractionated. 289 parts of distilled product, consisting of 283 parts of substantially pure trichloroacetonitrile and 6 parts of carbon tetrachloride, were obtained, giving a yield of 84.5% of trichloroacetonitrile calculated on the acetonitrile used.

*Example 4*

The catalyst was prepared by moistening silica gel with a solution of 3 parts of silver nitrate in 4 parts of water, then drying and treating with air containing hydrochloric acid as described in Example 3.

Chlorine was bubbled through liquid acetonitrile at 38° C., giving a mixture containing 3.5 molecules of chlorine to one molecule of acetonitrile, for 7 hours, 116 parts of acetonitrile being consumed. The gaseous mixture passed through the reaction chamber which was packed with the silver chloride-silica gel catalyst and was maintained at 380° C. at a space velocity of approximately 3.5 reciprocal minutes. The reaction products were condensed, and the crude product was separated, washed, dried, and distilled, as in Example 3. 252 parts of substantially pure trichloroacetonitrile were obtained, the yield based on the acetonitrile being 61.6%.

*Example 5*

A catalyst consisting of silver chloride supported on granular pumice was prepared as described in Example 3, and contained approximately 3.6 parts of silver chloride per 100 parts of pumice. This catalyst was employed for the reaction between acetonitrile and chlorine by the method described in Example 3. The temperature in the hottest part of the reaction chamber was maintained at 440° C., and the reacting gases passed through the catalyst mass at a space velocity of 3.3 reciprocal minutes.

The catalyst was used for a total length of time of 338 hours. The efficiency increased steadily at first, reaching a maximum of 80% to 85% after approximately 100 hours, and thereafter the yield of trichloroacetonitrile decreased steadily to 43% after 140 hours, the overall efficiency to this stage being 75.3%. The catalyst was then revived by treating with a mixture of chlorine and oxygen at 550° C. for 4 hours. Chlorination was continued, and the efficiency rose to a maximum of 76%, but fluctuated somewhat. After a total of 204 hours the catalyst was again revived, by heating with the chlorine-oxygen mixture at 550° C. for 4 hours and at 600° C. for 1 hour, after which treatment the efficiency again increased to a maximum of 76%, and was maintained at 70% to 75% for 20 hours. After a total of 243 hours, when the efficiency had fallen to about 50%, a third revival of the catalyst was carried out, by heating it in the chlorine-oxygen mixture in a silica tube at 700° C. for 2 hours. The efficiency then increased to 85% and was maintained above 70% for about 50 hours, after which time it again decreased. In the total time of running of 338 hours, the overall efficiency was 66.6%, and the weight of trichloroacetonitrile produced was 1580 times the weight of silver chloride present in the catalyst.

We claim:

1. A process for the production of a chlorinated aliphatic nitrile, which comprises reacting an aliphatic nitrile taken from the group consisting of acetonitrile and propionitrile with a chlorinating agent taken from the group consisting of chlorine, phosgene, and sulphuryl chloride in the vapour phase in the presence of a catalyst comprising a substance selected from the group consisting of silver, gold, platinum, palladium, and rhodium, and the oxides, hydroxides, and chlorides thereof at an elevated temperature between 200° C. and 500° C.

2. A process for the production of trichloroacetonitrile, which comprises reacting acetonitrile with a chlorinating agent taken from the group consisting of chlorine, phosgene, and sulphuryl chloride in the vapour phase in the presence of a catalyst comprising a substance selected from the group consisting of silver, gold, platinum, palladium, and rhodium, and the oxides, hydroxides, and chlorides thereof, at an elevated temperature between 200° C. and 500° C.

3. A process for the production of trichloroacetonitrile, which comprises reacting acetonitrile with not less than the stoichiometric proportion of a chlorinating agent taken from the group consisting of chlorine, phosgene, and sulphuryl chloride in the vapor phase in the presence of a catalyst comprising a substance selected from the group consisting of silver, gold, platinum, palladium, and rhodium, and the oxides, hydroxides and chlorides thereof, at an elevated temperature between 200° C. and 500° C.

4. A process for the production of trichloroacetonitrile, which comprises reacting acetonitrile and a chlorinating agent taken from the group consisting of chlorine, phosgene, and sulphuryl chloride, in such proportions as will provide between 6 and 8 atoms of chlorine to one molecule of acetonitrile, in the vapour phase in the presence of a catalyst comprising a substance selected from the group consisting of silver, gold, platinum, palladium, and rhodium, and the oxides, hydroxides and chlorides thereof, at an elevated temperature between 200° C. and 500° C.

5. A process for the production of trichloroacetonitrile, which comprises reacting acetonitrile with not less than the stoichiometric proportion of a chlorinating agent taken from the group consisting of chlorine, phosgene, and sulphuryl chloride in the vapour phase in the presence of a catalyst comprising a substance selected from the group consisting of silver, gold, platinum, palladium, and rhodium, and the oxides, hydroxides and chlorides thereof, at a temperature within the approximate limits of 200° C. to 500° C., the reactant mixture passing over the catalyst at a space velocity not greater than 7 reciprocal minutes.

6. A process for the production of trichloroacetonitrile, which comprises reacting acetonitrile with not less than the stoichiometric proportion of a chlorinating agent taken from the group consisting of chlorine, phosgene, and sulphuryl chloride in the vapour phase in the presence of a catalyst comprising a substance selected from the group consisting of silver, gold, platinum, palladium, and rhodium, and the oxides, hydroxides and chlorides thereof, at a temperature within the approximate limits of 200° C. to 500° C., the reactant mixture passing over the catalyst at a space velocity between 2 and 4 reciprocal minutes.

7. A process for the production of a chlorinated aliphatic nitrile, which comprises reacting an aliphatic nitrile taken from the group consisting of acetonitrile and propionitrile with a chlorinating agent taken from the group consisting of chlorine, phosgene, and sulphuryl chloride in the vapour phase in the presence of a catalyst comprising silver chloride and a porous support therefor, at an elevated temperature between 200° C. and 500° C.

8. A process for the production of a chlorinated aliphatic nitrile, which comprises reacting an aliphatic nitrile taken from the group consisting of acetonitrile and propionitrile with a chlorinating agent taken from the group consisting of chlorine, phosgene, and sulphuryl chloride in the vapour phase in the presence of a catalyst comprising silver chloride supported on pumice, at an elevated temperature betwen 200° C. and 500° C.

9. A process for the production of trichloroacetonitrile, which comprises reacting acetonitrile with not less than the stoichiometric proportion of a chlorinating agent taken from the group consisting of chlorine, phosgene, and sulphuryl chloride in the vapour phase in the presence of a catalyst comprising silver chloride and a porous support therefor, at a temperature within the approximate limits of 200° C. to 500° C., the reactant mixture passing over the catalyst at a space velocity not greater than 7 reciprocal minutes.

10. A process for the production of trichloroacetonitrile, which comprises reacting acetonitrile with not less than the stoichiometric proportion of a chlorinating agent taken from the group consisting of chlorine, phosgene, and sulphuryl chloride in the vapour phase in the presence of a catalyst comprising silver chloride and a porous support therefor, at a temperature within the approximate limits of 200° C. to 500° C., the reactant mixture passing over the catalyst at a space velocity between 2 and 4 reciprocal minutes.

11. A process for the production of trichloroacetonitrile, which comprises reacting acetonitrile and a chlorinating agent taken from the group consisting of chlorine, phosgene, and sulphuryl chloride in such proportions as will provide between 6 and 8 atoms of chlorine to one molecule of acetonitrile, in the vapour phase in the presence of a catalyst comprising silver chloride supported on pumice, at a temperature within the approximate limits of 200° C. to 500° C., the reactant mixture passing over the catalyst at a space velocity between 2 and 4 reciprocal minutes.

JAMES JOHN GRAY.
FRANK BURGESS.

REFERENCES CITED

The following references are of record in the file of this patent:

UNITED STATES PATENTS

| Number | Name | Date |
| --- | --- | --- |
| 2,375,545 | Foster | May 8, 1945 |
| 2,173,376 | Rose | Sept. 19, 1939 |
| 2,341,286 | Pines et al. | Feb. 8, 1944 |

Certificate of Correction

Patent No. 2,426,091.　　　　　　　　　　　　　　　　　　　　August 19, 1947.

JAMES JOHN GRAY ET AL.

It is hereby certified that error appears in the printed specification of the above numbered patent requiring correction as follows: Column 3, line 8, for "prunes" read *pumice*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*